T. A. FRIEDLANDER.
AUTOMOBILE SEAT.
APPLICATION FILED MAY 7, 1921.
1,405,108.
Patented Jan. 31, 1922.
2 SHEETS—SHEET 1.
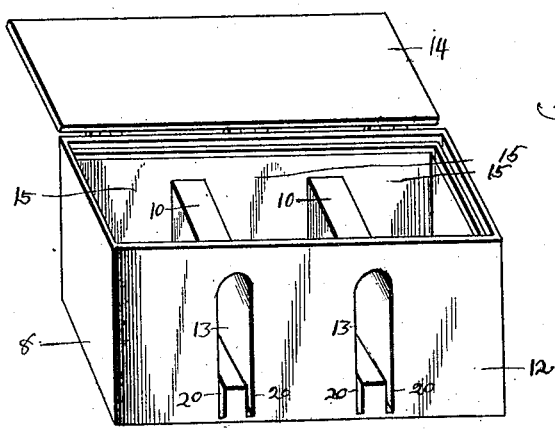
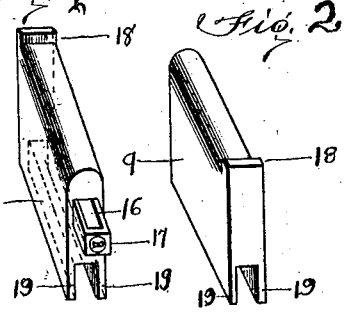
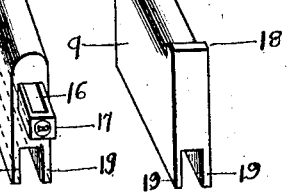
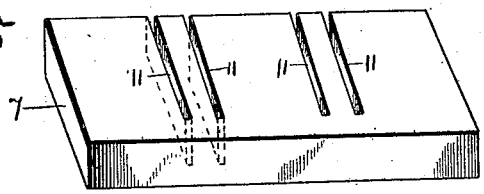
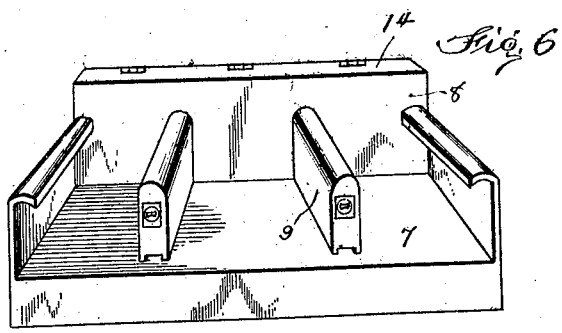
Inventor
Thomas A. Friedlander

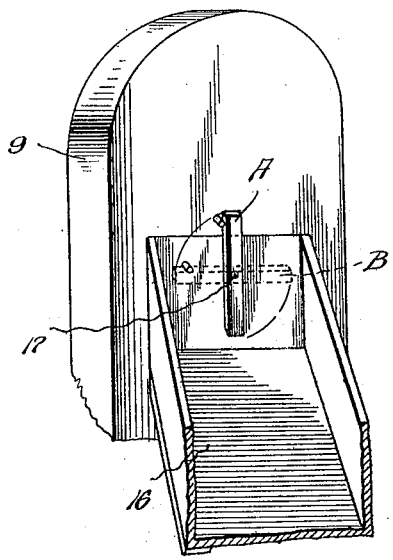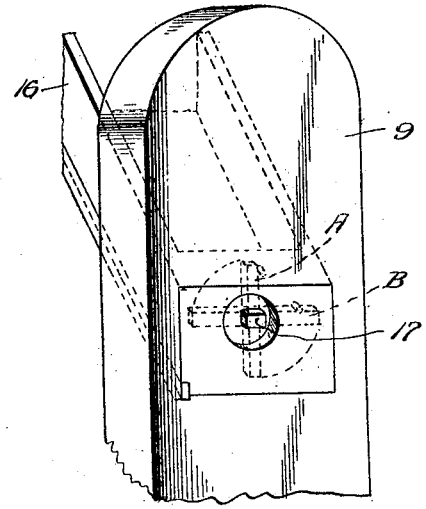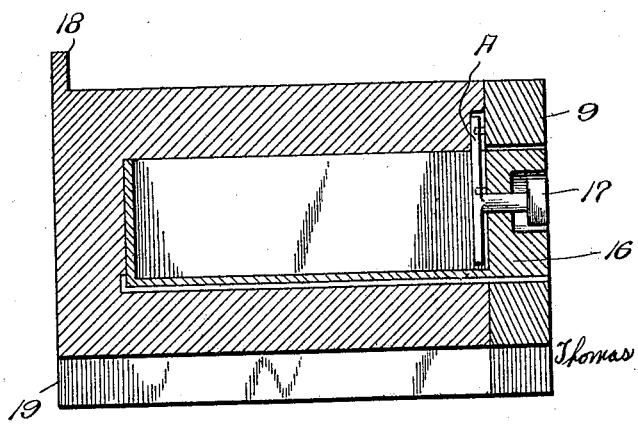

UNITED STATES PATENT OFFICE.

THOMAS A. FRIEDLANDER, OF NEWARK, NEW JERSEY.

AUTOMOBILE SEAT.

1,405,108. Specification of Letters Patent. Patented Jan. 31, 1922.

Application filed May 7, 1921. Serial No. 467,542.

*To all whom it may concern:*

Be it known that I, THOMAS A. FRIEDLANDER, a citizen of the United States, residing at 142 Livingston Street, Newark, in the county of Essex and State of New Jersey, have invented a new and useful Automobile Seat, of which the following is a specification.

My new invention relates to improvements in automobile seats, the feature of which is a sliding-arm-rest.

A compartment divided by sliding-arm-rest stalls or housings contained therein, a seat cushion having sliding-arm-rest guides and a sliding-arm-rest being the necessary combination in order to enjoy the comforts that the sliding-arm-rest affords.

The objects of my improvements are:

First: Not only to provide an arm-rest for each rear seat passenger, or front seat, especially the former, which is a feature in itself, but an arm-rest that slides back and forth, thus bringing to use the arm-rest or not as the passenger may want; and this arm-rest has a drawer fitted with a convenient hand-grasp for holding small necessities, the grasp operating the drawer or arm-rest.

Second: To afford added comfort by the use of these arm-rests to the automobile passenger even if he is in the middle of the seat, thus permitting the elbows to support upon the arm-rest, also allowing him to sit at any angle on any part of the seat and preventing him from shifting over the seat when the automobile goes over a bump or turns a curve or a corner, thus allowing the passenger to sit with easy chair-like ease and comfort. The arm-rest has novel features of its own.

I attain these objects by the mechanism illustrated in the accompanying drawing in which,—

Fig. 1 is a front view in detail of the sliding-arm-rest with its drawer and two purposed hand-grasp.

Fig. 2, a rear view of the sliding-arm-rest.

Fig. 3, a view of the two purposed hand-grasp or handle.

Fig. 4, a view of the compartments containing the sliding-arm-rest stalls or housings.

Fig. 5, a view of the seat cushion with its guides.

Fig. 6, a perspective view of the seat as it looks with the arm rests slid out for use and its drawers closed.

Fig. (7) is a view of interior of arm rest as seen from the rear and is a section of the front of arm-rest together with a section of the drawer, illustrating how the handle which is secured to the front part of drawer comes in contact with the front part of the arm-rest thus showing the operations of the handle in detail.

Fig. (8) is a view of Fig. (7) as seen from the exterior.

Fig. (9) is a profile cross-section view of the arm-rest and drawer, also showing handle in position for actuating the drawer and arm-rest simultaneously.

Similar numerals refer to similar parts throughout the several views.

The cushion 7, containing one or two guides for each arm-rest, in this instance two, is placed against the compartment 8, thus making the stall guides 20 and the cushion guides 11 meet, thereby forming a complete track in which travels the sliding-arm-rest 9, which has one or more runners or legs; in this instance two runners are used. When one runner is used, the said runner is placed on the bottom center of arm-rest.

The sliding-arm-rest 9, when not in use, fits into and is received by the arm-rest housing or stall 10, which is shaped to properly house and securely retain it, and the arm-rest 9, when wanted for use, is slid or pulled out of the stall 10 and into the guides 11, which are in the seat cushion 7. The said guides are either integral with said cushion or placed between separate cushions. The number of guides used are similar to the number of runners on the said sliding-arm-rest. The front wall 12 of the compartments 15 has stall openings 13, 13, and serves as the back rest for the occupant of seat. The top side 14 of this compartment 8 opens by a convenient means which gives access to the divisioned compartments 15, 15, 15, which are for packages, accessories, etc. The left, right and rear walls and the bottom side of this arrangement, see Fig. 4, are integral with the automobile body, and the stalls 10 contained therein, see Fig. 4, are as heretofore mentioned. Its purpose and shape is to properly receive or house and securely retain the arm-rests 9 when not in use, thus leaving the front side of said arm-rest 9 flush with the back rest 12. This arm-rest 9 is provided with a drawer 16, see Fig. 1, for containing ladies' or gentlemen's small necessities and is fitted with a handle or hand-grasp 17, see Fig. 3. The design and object of this handle, see Figs. (7, 8 and 9), is to actuate the drawer which is in the arm rest separately and also the drawer and arm-rest simultaneously. This is done by turning the handle 17 one way to the vertical position A so that the catch 17 which is secured to the drawer 16 comes in contact with the arm-rest 9 thus actuating or drawing the arm-rest 9 together with the drawer 16 out of the stall 10 and into the guides 11, and by turning the catch of the handle 17 to the horizontal position B only the drawer 16 may be drawn out of the arm-rest 9 as shown in Fig. 1 because the catch which is secured to the front of the drawer does not interfere with anything when in the B position. Also the arm-rest has a stop 18, on the rear top side, which without, or together with the length of the cushion guides 11, governs the length of arm-rest for use, or prevents the arm-rest 9 from sliding out too far of its housing 10, thus assuring at all times a staunch support for the arm-rest 9, whose bottom, standards, legs or runners 19 travel in the guides 20 of the stall 10, and the guides 11 in the cushion 7. These mentioned guides are deep enough to firmly support the sliding-arm-rest 9 at the bottom at all times, and the rear is well supported by means of part of the arm-rest remaining in the stall 10. Thus the arm-rest which is the feature of the seat is supported substantially at all times when in use or not. Fig. 6 shows how the sliding-arm-rest seat looks with the arm-rests out and its drawers closed. The arm-rests are shown in a raised position from the cushion upholstery for the protection of the upholstery. This is done by making the runners 19 of the arm-rest 9 higher than the depth of the guides 11 and 20, shown in dotted lines, which are of the same measurements except that the lengths may vary.

I am aware that compartments are in use today in automobiles but they are not like the one described in this specification.

Therefore I claim broadly:

The combination in an automobile seat, of a sliding arm rest having a drawer therein which is fitted with a hand-grasp arranged to operate said arm rest and drawer either selectively or simultaneously; a seat cushion provided with guides for receiving and supporting said sliding arm rest in operative position, and a compartment integral with the automobile body forming a back rest for the seat, said compartment containing housings to receive and retain said arm rests in inoperative position, substantially as described.

THOMAS A. FRIEDLANDER.